United States Patent [19]

French

[11] Patent Number: 5,439,702
[45] Date of Patent: Aug. 8, 1995

[54] METHOD OF MIXING MEAT WITH DRIED FIBROUS COLLAGEN

[75] Inventor: James W. L. French, Dorchester, England

[73] Assignee: Stork Fibron B.V., Oss, Netherlands

[21] Appl. No.: 203,604

[22] Filed: Feb. 28, 1994

Related U.S. Application Data

[63] Continuation of Ser. No. 35,490, Mar. 22, 1993, abandoned, which is a continuation of Ser. No. 752,567, Sep. 6, 1991, abandoned.

[30] Foreign Application Priority Data

Mar. 8, 1989 [GB] United Kingdom ............... 89052922

[51] Int. Cl.$^6$ .......................... A23L 1/31; A23L 1/317
[52] U.S. Cl. .................................. 426/641; 426/646
[58] Field of Search ............... 426/641, 646, 652, 657, 426/513

[56] References Cited

U.S. PATENT DOCUMENTS

| | | | |
|---|---|---|---|
| 3,033,687 | 5/1962 | Harper et al. | 426/646 |
| 3,416,931 | 12/1968 | Posegate | 426/513 X |
| 3,713,846 | 1/1973 | Turner et al. | 426/646 X |
| 3,809,772 | 5/1974 | Jones et al. | 426/657 X |
| 4,868,002 | 9/1989 | Scaglione et al. | 426/513 X |

FOREIGN PATENT DOCUMENTS

| | | | |
|---|---|---|---|
| 716531 | 8/1965 | Canada | 426/646 |
| 964106 | 3/1975 | Canada | 426/646 |
| 2132785 | 11/1972 | France | |
| 1381594 | 1/1975 | United Kingdom | |
| 2201887 | 9/1988 | United Kingdom | |
| 8911799 | 12/1989 | WIPO | |

OTHER PUBLICATIONS

Komanowsky et al, "Production of Comminuted Collagen for Novel Applications", *Journal of American Leather Chemists Assoc.*, 1974, pp. 410–422.

*Primary Examiner*—Arthur L. Corbin
*Attorney, Agent, or Firm*—Burns, Doane, Swecker & Mathis

[57] ABSTRACT

A method is provided of improving meat products which comprises mixing with a de-boned or separated meat (D or S meat), a fibrous collagen in order to distribute the collagen substantially homogeneously throughout the D or S meat, removing occluded air and voids from the mixture and forming the mixture into discrete portions or a continuous extrudate by pressing the mixture through a restrictor.

27 Claims, 1 Drawing Sheet

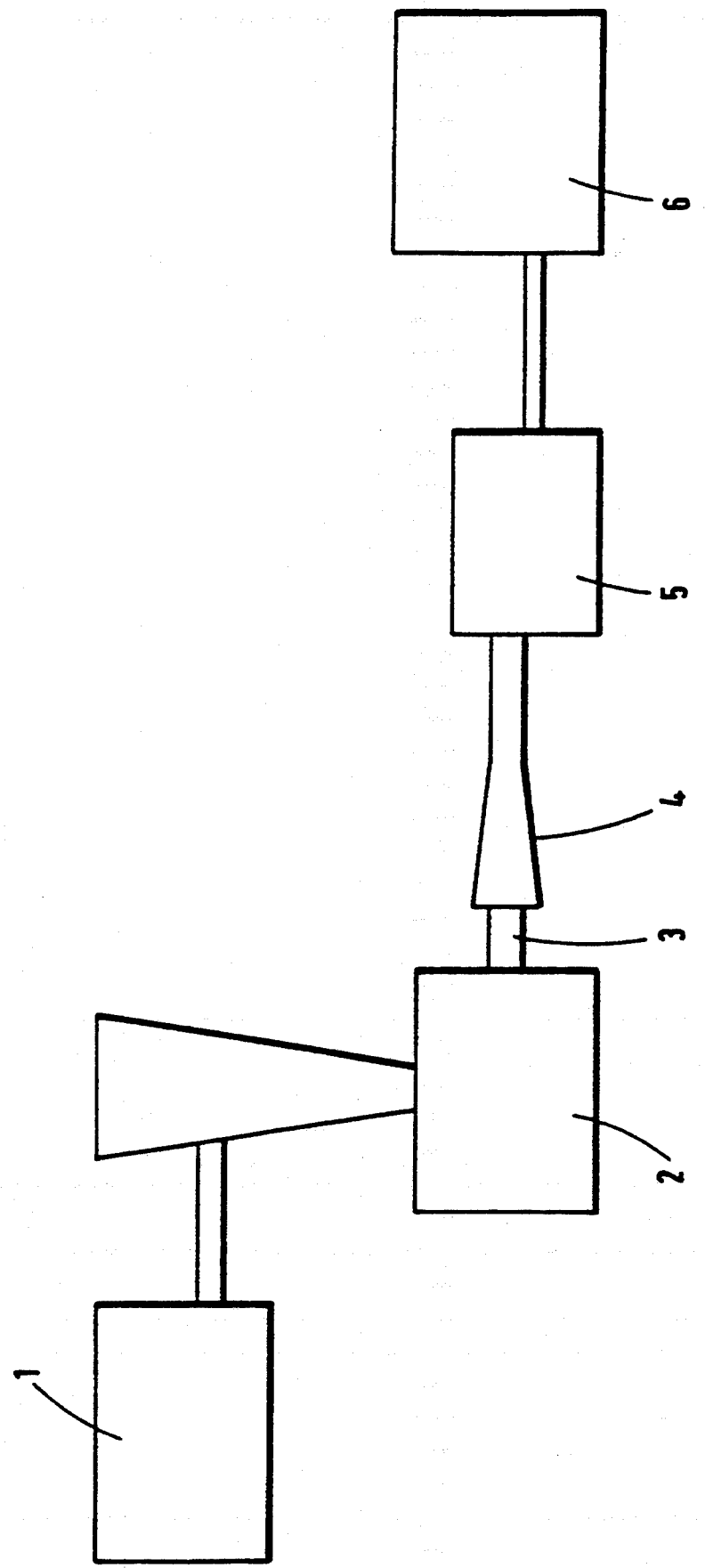

METHOD OF MIXING MEAT WITH DRIED FIBROUS COLLAGEN

This application is a continuation of application Ser. No. 08/035,490, filed Mar. 22, 1993, now abandoned, which is a continuation of Ser. No. 752,567, filed Sep. 6, 1991, now abandoned.

BACKGROUND OF THE INVENTION

1. Field of Use

The present invention relates to a method of reconstituting meat and the improved products resulting therefrom.

2. Discussion of Related Art

De-boned or separated meat is obtained by de-boning carcasses after removal of meat cuts and the resulting de-boned or separated meat (hereinafter D or S meat) is conventionally added to higher quality meat, e.g. forequarter beef in the production of manufactured food products such as beefburgers or canned meat or pie filling. There are, however, limitations in the amount of D or S meat which can be added to such meat products, primarily because the resulting mixed meat product has a rather poor structure and texture.

OBJECTS AND SUMMARY OF THE INVENTION

The present invention is based on the discovery that if fibrous collagen is introduced into the D or S meat under certain conditions, the resulting restructured product has enhanced properties including, particularly, texture which approximates to those of higher quality meat cuts.

According to the present invention there is provided a method of reconstituting meat products, which comprises mixing with a de-boned or separated meat (D or S meat) a fibrous collagen so as to distribute the added collagen substantially homogeneously throughout the D or S meat, removing occluded air and voids from the mixture and forming the mixture into discrete portions, or a continuous extrusion by pressing the mixture through a restrictor.

According to a further aspect, the present invention provides a reconstituted meat product which comprises an intimate mixture of de-boned or separated meat (D or S meat) and at least 1% by weight of fibrous collagen.

The manufacture of the reconstituted meats products in accordance with the process of this invention is illustrated by the accompanying schematic drawing and following description.

BRIEF DESCRIPTION OF THE DRAWING

The FIGURE is a schematic illustration of a system in accordance with the present invention.

DETAILED DESCRIPTION OF PREFERRED EMBODIMENTS

As is well known, collagen is a protein which forms the main constituent of connective tissue and is present in higher proportions in tendons, bones and skin. Various commercial processes exist for recovering collagen from such sources, e.g. that described in U.S. Pat. No. 2,979,438. Typically, the connective tissue, skin or bone is broken down mechanically and treated with an aqueous salt-solution and/or enzymes to remove associated carbohydrates fats and shorter chain proteins. Collagen exists in nature, together with accompanying fibrous proteins, such as elastin and reticulin, and generally such additional fibrous proteins are not removed in the preparation of the fibrous collagen starting material of the present invention. After removal of carbohydrates, fats and shorter chain proteins as described above, the fibrous residue is dried at a temperature sufficiently low to avoid denaturing the protein.

It is important for the purposes of this invention that the collagen is employed in a fibrous state. Commercially available collagen is generally supplied as a dried powder rather than as a fibre. In the performance of the process of this invention, fibrous collagen having an average fibre length of from about 0.5 to 3 mms (typically about 1 mm) is preferred.

After separation of fats, carbohydrates etc. as described above, the raw collagen material is subjected to milling. At this stage, the collagen material normally has a water-content of 65 to 70%. The raw collagen material can be reduced to approximately pea size particles by mincing the wet product through an apertured plate having approximately 5 mm openings, e.g. using a Hobart mincer.

The minced raw collagen is then subject to drying in a controlled fashion. The drying temperature should be maintained below about 50°-55° C., in order to avoid denaturing and case hardening the collagen. A fluidised bed dryer may be employed such as the shaking fluid bed dryer manufactured by Stork Friesland of Gorredijk, Holland. Prior to feeding the collagen material to the fluid bed dryer, it is agitated using a mechanical stirrer. A drying temperature in the fluidised bed of about 47° to 50° C. is suitable. Drying is continued to a water-content of about 7 to 10%.

The dried fibrous collagen is mixed with de-boned or separated meat and preferably this mixing is carried out in a mixer/blender (1) of the horizontal paddle type, since such an apparatus best achieves an homogeneous dispersion of the fibres in the D or S meat. An example of a suitable paddle mixer is the model RS750 manufactured by Risco Brevetti S.p.A. of Zane, Italy. This machine comprises a trough and a pair of longitudinal shafts on which a series of inclined, interengaging paddles are mounted. The shafts may be rotated inwardly or outwardly, and in mixing the collagen into the D or S meat, the paddles are preferably rotated both inwardly and outwardly. The mixing can be carried out together with some added salt and water, although the amount of added salt should preferably be in the range of 0.5 to 1% by weight of the total mixture. The added water causes some degree of swelling of the collagen or associated gelatin which may be present in the collagen. This absorption of water gives the resulting product a juiciness which is not present in the original D or S meat. Preferably any added water should not constitute more than 20% by weight, and a preferred amount is 5 to 15% by weight. The de-boned or separated meat may include ground pork, lamb, beef, poultry or fish, including shellfish and the fibrous collagen may or may not be derived from the same species as the D or S meat. However, it is generally advantageous to use a collagen from the same species so that the resulting product can be labelled as meat from a single specified animal source.

The fibrous collagen is mixed in any desired proportions with the D or S meat. While there is no precise minimum amount of collagen fibres which should be mixed with the D or S meat, a significant improvement in texture and consistency of the resulting mix is not achieved unless a minimum of about 1% of collagen fibres is mixed with the D or S meat. There is no critical upper limit, although, generally speaking, addition of more than about 10% does not give rise to any further benefit. Preferred amounts of added collagen are in the range of 3 to 6%.

From the paddle mixer, which is preferably operated under vacuum, the mixture is transferred to a vacuum filler machine (2). This transfer can be made via a hopper as shown or transferred while held under vacuum. The vacuum filling machine (2) is of the kind which is used, e.g. for filling sausage casings and includes a piston which forces the mixture out of the filling machine through a tube 3 and into a restrictor 4. Any occluded air or voids in the mixture of collagen and D & S meat are removed in the vacuum filling machine. Restrictor 4 incorporates a tapered portion which tapers inwardly in the direction in which the mixture is forced into a portion forming machine 5. Machine 5 forms the mixed meat and collagen into portions, e.g. by compression, between shaped plates or by intermittent or continuous extrusion. The portion forming machine may be of the kind used for forming hamburgers or meat patties. At this point, the portioned product may be packed into casings, e.g. sausage skins, and/or transferred to a plate freezer 6 in which the portioned product is placed between cooled plates and rapidly frozen. After freezing the portions are held in a frozen food store.

The mixing temperature in paddle mixer 1 is preferably maintained at a minimum of about 6° to 7° C., preferably about 6° to 10° C., when there tends to be a release of myosin and other proteins, which is desirable. At this temperature there is little or no conversion of the collagen to gelatin. Temperatures in excess of 10° C. should be avoided to limit any risk of bacterial development. Indeed the whole processing stage should be limited to a maximum of 10° C. In the initial mixing stage, e.g. in the horizontal paddle mixer 1, the raw D or S meat may be mixed alone with the collagen fibres and the resulting product mixed subsequently with whole meat. Alternatively, whole muscle meat, such as forequarter beef, may be mixed in with the D or S meat and the collagen initially.

The properties of the restructured meat products are improved by forcing the product through a restrictor after compounding it in the vacuum filling machine. Generally, the restrictor should comprise an inwardly extending tubular passageway followed by a straight section or reverse tapered section, so that the compounded meat is subjected to an increased pressure followed by a gradual release of pressure. During the pressing stage, during which the compounded product is forced out of the mixer, a pressure of 1 to 10 atmospheres gauge is preferably employed. The step of forcing the compounded meat out of the mixer and then controlling the release of pressure improves the texture and appearance of the product possibly as a result of some aligning of the collagen fibres.

Following the step of extruding the product from the vacuum filling machine, the restructured product is conveniently shaped and pressed into portions of desired size and stored under a maintained pressure. This can be achieved by freezing in a plate freezer or packing the product in a restraining packaging. This seems to have the effect of maintaining the desirable texture and binding properties of the product, possibly as a result of some continuing reaction during storage involving partial joining of the meat and collagen protein.

When subsequently cooked, there is a partial conversion of the collagen into gelatin which gives beneficial binding properties to the product in food manufacturing procedures. Gelatin or other edible binders may also be introduced into the product, preferably at the stage of mixing the collagen with the D or S meat.

I claim:

1. A method of improving meat products which comprises mixing a de-boned or separated meat (D or S meat) with dried fibrous collagen having a water content of not more than about 10% in order to distribute the dried fibrous collagen substantially homogeneously throughout the D or S meat and forming the mixture into discrete portions or a continuous extrudate, said dried fibrous collagen providing improved texture and consistency in said products.

2. A method according to claim 1 in which the mixing is conducted at a temperature of at least about 7° C.

3. A method according to claim 2, wherein the fibrous collagen is dried to a water content of 7 to 10% by weight prior to mixture with the D or S meat.

4. A method as claimed in claim 1 further comprising the step of removing occluded air and voids from the mixture prior to forming the mixture into discrete portions.

5. A method according to claim 4 in which occluded air is removed in a vacuum filling machine and the mixture forced through a restrictor.

6. A method according to claim 5 in which the restrictor comprises a tubular exit passage from the filling machine, said exit passage tapering inwardly from said machine.

7. A method according to claim 6, wherein the fibrous collagen is dried to a water content of 7 to 10% by weight prior to mixture with the D or S meat.

8. A method according to claim 6 in which the restrictor is arranged to feed the product to a machine for dividing it into portions and then freezing the portions or packing them into casings.

9. A method according to claim 8, wherein the fibrous collagen is dried to a water content of 7 to 10% by weight prior to mixture with the D or S meat.

10. A method according to claim 5 in which the restrictor comprises a tubular exit passage which has a first portion which tapers inwardly and a second tubular portion which has a substantially uniform cross-section or tapers outwardly.

11. A method according to claim 10, wherein the fibrous collagen is dried to a water content of 7 to 10% by weight prior to mixture with the D or S meat.

12. A method according to claim 5, wherein the fibrous collagen is dried to a water content of 7 to 10% by weight prior to mixture with the D or S meat.

13. A method according to claim 1 wherein the fibrous collagen is dried to a water content of 7 to 10% by weight prior to mixture with the D or S meat.

14. A method according to claim 1, wherein the mixing step includes mixing a sufficient amount of fibrous collagen so that the fibrous collagen is at least 1% by weight of the mixture.

15. A method according to claim 14, wherein the fibrous collagen is 3 to 6% by weight of the mixture.

16. A method according to claim 14, wherein the fibrous collagen is in the form of fibres having an average length of about 0.5 to 3 mm.

17. A method according to claim 1 further comprising the step of cooking the discrete portions or continuous extrudate to effect a partial conversion of the collagen to gelatin;

whereby the D or S meat is bound together to form a coherent product having improved texture.

18. A method as claimed in claim 17, wherein said mixing is carried out at a temperature of not more than about 10° C.

19. A method as claimed in claim 17, wherein the dried, fibrous collagen has a fibre length between about 0.5 and 3 mm.

20. A method as claimed in claim 17, wherein the collagen is added in an amount of from about 1 to 10% by weight of the D or S meat.

21. A method as claimed in claim 17, wherein the collagen has a water content between about 7 and 10% by weight.

22. A method according to claim 17 wherein the D or S meat is mixed with at least 1% of dried fibrous collagen having a fibre length of at least 0.5 mm to distribute the fibrous collagen throughout the meat, said collagen having been obtained by milling and drying under conditions which avoid denaturing the collagen and the resulting mixture is pressed to compact the meat together prior to cooking the resulting product.

23. A method as claimed in claim 22, wherein said mixing is carried out at a temperature of not more than about 10° C.

24. A method as claimed in claim 22, wherein the fibre length is between about 0.5 and 3 mm.

25. A method as claimed in claim 22, wherein water in an amount of 5–15% is added to the D or S meat when said meat is mixed with said dried fibrous collagen.

26. A method as claimed in claim 22, wherein the collagen has a water content of less than about 10% by weight.

27. A method as claimed in claim 22, wherein said fibrous collagen has been dried in a fluidized bed dryer at a temperature not greater than about 55° C.

* * * * *